US010902576B2

United States Patent
Trumbauer et al.

(10) Patent No.: US 10,902,576 B2
(45) Date of Patent: Jan. 26, 2021

(54) SYSTEM AND METHOD FOR ELECTRONIC DIE INKING AFTER AUTOMATIC VISUAL DEFECT INSPECTION

(71) Applicant: Texas Instruments Incorporated, Dallas, TX (US)

(72) Inventors: Eric Robert Trumbauer, Celina, TX (US); Brant William Paquette, Allen, TX (US); Vince Christian Samek, Richmond, VA (US); Michael Jay Jenson, Richardson, TX (US); David Matthew Curran, Plano, TX (US); Jon Evan Button, Dallas, TX (US); Charles David Gordon, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 223 days.

(21) Appl. No.: 15/497,925

(22) Filed: Apr. 26, 2017

(65) Prior Publication Data
US 2018/0047149 A1 Feb. 15, 2018

Related U.S. Application Data
(60) Provisional application No. 62/374,104, filed on Aug. 12, 2016.

(51) Int. Cl.
*G06K 9/00* (2006.01)
*G06T 7/00* (2017.01)
*G06T 7/70* (2017.01)

(52) U.S. Cl.
CPC ............ *G06T 7/0004* (2013.01); *G06T 7/001* (2013.01); *G06T 7/70* (2017.01); *G06T 2207/30148* (2013.01)

(58) Field of Classification Search
CPC ................................ G06T 7/0004; G06T 7/70
See application file for complete search history.

(56) References Cited

U.S. PATENT DOCUMENTS 5,946,408 A * 8/1999 Honda .............. H01L 21/67271
382/149
6,122,397 A * 9/2000 Lee .......................... G06T 7/001
382/141
(Continued)

FOREIGN PATENT DOCUMENTS

JP          2008261692          10/2008

OTHER PUBLICATIONS

Takamori et al., "Use of computer optimization programs for the enhancement of Nikon stepper throughput with defectivity reduction benefits." In Integrated Circuit Metrology, Inspection, and Process Control VI, vol. 1673, pp. 605-614. International Society for Optics and Photonics, 1992. (Year: 1992).*
(Continued)

*Primary Examiner* — Feng Niu
(74) *Attorney, Agent, or Firm* — Rose Alyssa Keagy; Charles A. Brill; Frank D. Cimino

(57) ABSTRACT

A method of providing a semiconductor device and a computer-readable medium having instructions for performing the method are disclosed. The method includes receiving a first wafer defect map that defines comparison regions and identifies visual defect locations for a wafer. A format of the comparison regions is determined, with the format chosen from a group including die-to-die, partial-shot-to-partial-shot and full-shot-to-full-shot. If the comparison format is not die-to-die, mapping information is received that provides die locations within the comparison regions. A wafer layout map is provided that identifies die locations within the wafer.

20 Claims, 12 Drawing Sheets

(56) References Cited

U.S. PATENT DOCUMENTS

| | | | |
|---|---|---|---|
| 6,324,298 B1* | 11/2001 | O'Dell | G01N 21/9501 257/E21.53 |
| 6,347,150 B1* | 2/2002 | Hiroi | G06T 7/001 382/149 |
| 6,808,947 B2 | 10/2004 | Farnworth et al. | |
| 7,074,710 B2* | 7/2006 | Whitefield | G03F 7/2028 257/629 |
| 7,105,364 B2* | 9/2006 | Suciu | H01L 22/20 257/E21.525 |
| 7,133,550 B2* | 11/2006 | Hiroi | G01N 21/9501 382/145 |
| 7,155,052 B2* | 12/2006 | Geshel | G06T 7/0006 382/144 |
| 7,266,235 B2* | 9/2007 | Hiroi | G01N 21/9501 348/126 |
| 7,283,659 B1* | 10/2007 | Bakker | G06K 9/6254 382/144 |
| 7,414,324 B2* | 8/2008 | Kim | H01L 21/68 257/797 |
| 7,423,746 B2* | 9/2008 | Takeda | G01N 21/95607 250/306 |
| 7,425,704 B2* | 9/2008 | Miyai | H01J 37/265 250/306 |
| 7,452,733 B2* | 11/2008 | Suciu | H01L 22/20 257/E21.525 |
| 7,457,453 B2* | 11/2008 | Hiroi | G01N 21/9501 348/126 |
| 7,460,211 B2* | 12/2008 | Whitefield | G03F 7/2028 355/53 |
| 7,486,391 B2* | 2/2009 | Chen | G03F 1/82 356/237.1 |
| 7,742,162 B2* | 6/2010 | Tsutsui | G01N 21/95607 356/237.2 |
| 7,767,473 B2* | 8/2010 | Suciu | H01L 22/20 438/15 |
| 7,796,801 B2* | 9/2010 | Kitamura | G06K 9/00 348/125 |
| 7,813,539 B2* | 10/2010 | Shibuya | G06T 7/0004 382/141 |
| 7,894,658 B2* | 2/2011 | Hiroi | G01N 21/9501 348/126 |
| 7,957,579 B2* | 6/2011 | Hiroi | G01N 21/9501 348/126 |
| 8,036,447 B2* | 10/2011 | Hayakawa | G06T 7/001 382/141 |
| 8,059,886 B2* | 11/2011 | Gao | G06T 7/0006 382/149 |
| 8,273,523 B2* | 9/2012 | Detweiler | H01L 21/76816 430/313 |
| 8,494,802 B2* | 7/2013 | Chen | G01N 21/9501 324/457 |
| 8,707,221 B2* | 4/2014 | Durkan | G06F 17/5081 716/52 |
| 9,406,117 B2* | 8/2016 | Touya | G01N 21/9503 |
| 9,673,022 B2* | 6/2017 | Greenberg | H01J 37/222 |
| 9,715,170 B2* | 7/2017 | Jang | G03F 1/22 |
| 2001/0016061 A1* | 8/2001 | Shimoda | G06T 7/0004 382/149 |
| 2002/0054703 A1* | 5/2002 | Hiroi | G01N 21/9501 382/149 |
| 2002/0072162 A1* | 6/2002 | Dor | H01L 22/20 438/200 |
| 2002/0161532 A1* | 10/2002 | Dor | H01L 22/20 702/35 |
| 2004/0128630 A1* | 7/2004 | Ward | G03F 7/70433 716/56 |
| 2006/0036394 A1* | 2/2006 | Chen | G01R 31/31718 702/123 |
| 2006/0094246 A1* | 5/2006 | Whitefield | G03F 7/2028 438/725 |
| 2006/0191634 A1* | 8/2006 | Whitefield | G03F 7/2028 156/345.1 |
| 2006/0255824 A1* | 11/2006 | Liao | G01R 31/2894 324/754.03 |
| 2006/0280358 A1* | 12/2006 | Ishikawa | G01N 21/95607 382/149 |
| 2007/0067134 A1* | 3/2007 | Borowicz | G05B 19/41875 702/127 |
| 2007/0082462 A1* | 4/2007 | Kim | G01R 31/2893 438/458 |
| 2007/0229791 A1* | 10/2007 | Inoue | G01B 11/0608 355/67 |
| 2007/0230770 A1* | 10/2007 | Kulkarni | G06F 17/5045 382/149 |
| 2007/0288219 A1* | 12/2007 | Zafar | G03F 1/84 703/14 |
| 2008/0004823 A1* | 1/2008 | Matsushita | G05B 19/41875 702/82 |
| 2008/0067371 A1* | 3/2008 | Kurihara | G01N 21/9501 250/307 |
| 2008/0130982 A1* | 6/2008 | Kitamura | G06T 7/001 382/144 |
| 2008/0153184 A1* | 6/2008 | Akomer | H01L 21/78 438/16 |
| 2008/0163140 A1* | 7/2008 | Fouquet | G03F 1/84 700/110 |
| 2008/0250384 A1* | 10/2008 | Duffy | G03F 7/70525 716/55 |
| 2008/0281548 A1 | 11/2008 | Algranati et al. | |
| 2009/0037134 A1* | 2/2009 | Kulkarni | G01N 21/9501 702/127 |
| 2009/0074286 A1* | 3/2009 | Kitazawa | G01N 21/9501 382/144 |
| 2009/0080759 A1* | 3/2009 | Bhaskar | G06T 7/001 382/141 |
| 2009/0268959 A1* | 10/2009 | Harada | G06T 7/001 382/149 |
| 2011/0170766 A1* | 7/2011 | Gao | G06T 7/0006 382/149 |
| 2011/0187848 A1* | 8/2011 | Choi | G11C 29/56 348/92 |
| 2011/0276935 A1* | 11/2011 | Fouquet | G06T 7/0006 716/112 |
| 2012/0002861 A1* | 1/2012 | Nishiura | G06K 9/6255 382/149 |
| 2012/0087569 A1 | 4/2012 | O'Dell et al. | |
| 2012/0093392 A1* | 4/2012 | Takagi | G01N 21/9501 382/149 |
| 2012/0314054 A1* | 12/2012 | Chou | G05B 19/41875 348/87 |
| 2013/0137193 A1* | 5/2013 | Campochiaro | H01L 22/22 438/5 |
| 2013/0174102 A1* | 7/2013 | Leu | G05B 19/41875 716/52 |
| 2013/0214388 A1* | 8/2013 | Subramanian | H01L 23/544 257/620 |
| 2014/0153814 A1* | 6/2014 | Lin | G06T 7/001 382/149 |
| 2014/0199792 A1* | 7/2014 | Miyoshi | H01L 22/12 438/16 |
| 2015/0110384 A1* | 4/2015 | Luoh | G06T 7/0006 382/149 |
| 2015/0213172 A1* | 7/2015 | Luoh | G06F 17/5045 716/102 |
| 2015/0228589 A1* | 8/2015 | Brenna | H01L 21/82 257/797 |
| 2015/0279024 A1* | 10/2015 | Tsuchiya | G03F 1/84 382/144 |
| 2016/0282404 A1* | 9/2016 | Goren | G01R 31/2601 |
| 2017/0133287 A1* | 5/2017 | Moll | H01L 21/02488 |
| 2018/0047149 A1* | 2/2018 | Trumbauer | G06T 7/001 |

OTHER PUBLICATIONS

Inanami et al., "Study of practical TAT reduction approaches for EUV flare correction." In Extreme Ultraviolet (EUV) Lithography,

(56) References Cited

OTHER PUBLICATIONS vol. 7636, p. 763616. International Society for Optics and Photonics, 2010. (Year: 2010).*
International Search Report, PCT/US 2017/046833, dated Nov. 9, 2017.

* cited by examiner

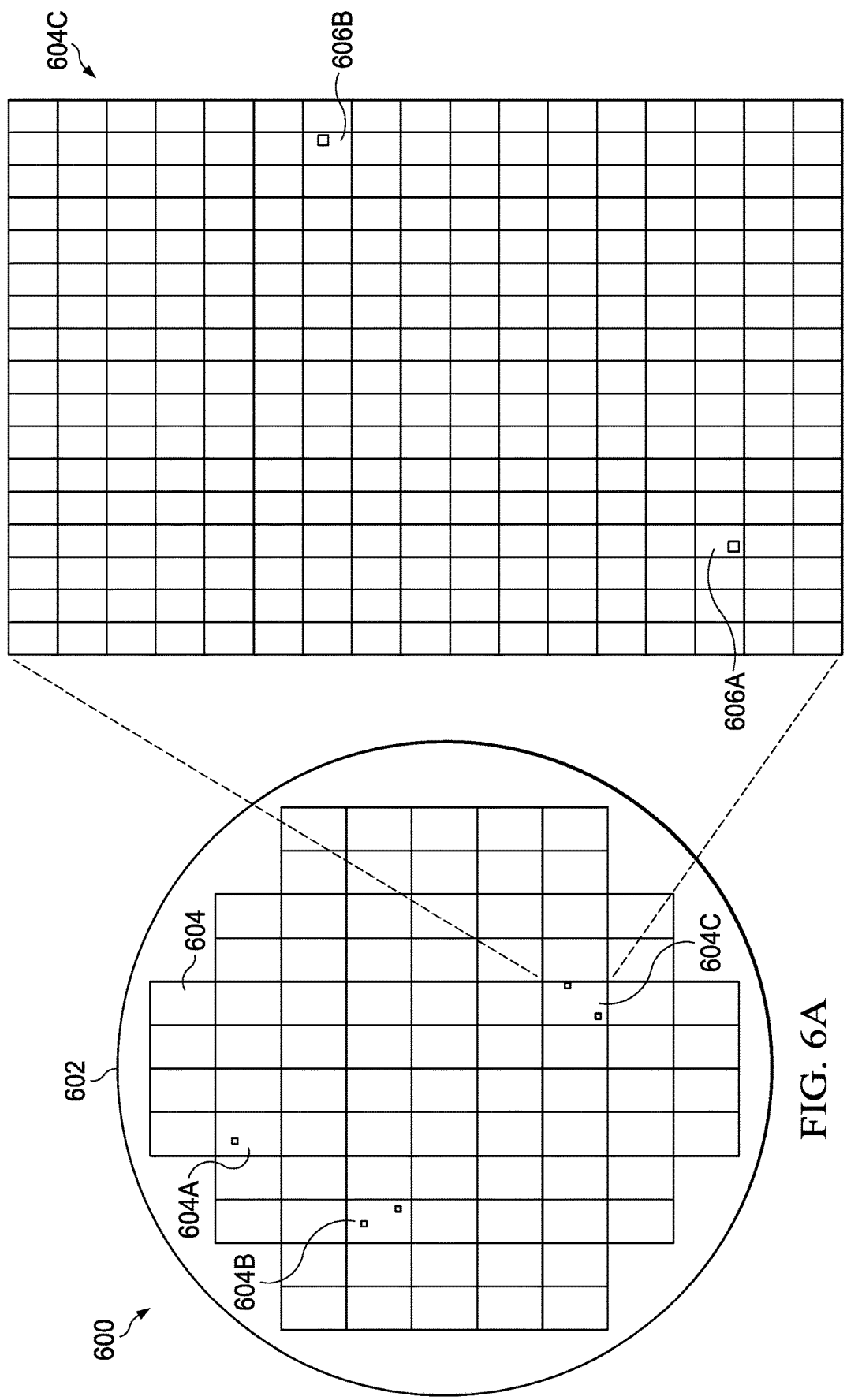

SYSTEM AND METHOD FOR ELECTRONIC DIE INKING AFTER AUTOMATIC VISUAL DEFECT INSPECTION

CLAIM OF PRIORITY AND RELATED PATENT APPLICATIONS

This nonprovisional application claims priority based upon the following prior United States provisional patent application(s): (i) "Novel Defect Inspection Electronic Die Inking Application," Application No.: 62/374,104, filed Aug. 12, 2016, in the name(s) of Eric Robert Trumbauer, Brant William Paquette, Vincent Christian Samek, Michael Jay Jenson, David Matthew Curran, Jon Evan Button and Charles David Gordon; which is hereby incorporated by reference in its entirety.

FIELD OF THE DISCLOSURE

Disclosed embodiments relate generally to the field of defect inspection of semiconductor wafers. More particularly, and not by way of any limitation, the present disclosure is directed to a system and method for electronic die inking after automatic visual defect inspection.

BACKGROUND

The fabrication of semiconductor integrated circuits (ICs) is an extremely complex process that involves several hundred or more operations. ICs are fabricated by selectively implanting impurities into and applying conductive and insulation layers onto a semiconductor substrate. Semiconductor ICs (die) are not manufactured individually but rather as an assembly that can range to several hundred or more dies on a wafer, which is then diced up to produce the individual die.

Because of various defects that can occur during the fabrication of a wafer, a significant number of dies have to be discarded for one reason or another. Defects are typically caused by foreign particles, minute scratches, and other imperfections introduced during photoresist, photomask, and diffusion operations to which the wafer is subjected. Two primary methods of detecting defects are employed: Automatic Visual Inspection (AVI), which can be employed at multiple steps in the manufacturing process, and electrical probe testing of a finished die.

At a log point for outgoing quality control inspection in an example manufacturing process, wafers are inspected and large defects, e.g., above a designated size, are recorded. Inspections are also performed after designated manufacturing steps and are typically designed to look for much smaller defects. Many AVI tools are not capable of performing automated electronic die inking of defective dies based on the inspection, resulting in manual processes to collect the inspection data and provide inspection results to programs able to perform the die inking, typically the testware for probe testing. Further complicating the problem, as die sizes continue to shrink, existing AVI tools are not always capable of performing examination on a die-to-die basis, leading to additional manual processing to identify individual dies within the wafer. The lack of automatic die inking processes after visual inspection also leads to tedious and inconsistent execution of manual guardbanding. Guardbanding is the process of marking as defective those dies that surround specific known defects but are not visibly affected by the defect. Some devices require guardbanding on as many as three via levels. Manual multi-level guardbanding processes are time intensive and prone to variation and error.

SUMMARY

Embodiments of the application include a method of providing a semiconductor device and program instructions to perform the method. After specific layers of a wafer are formed, the layer is examined by an AVI tool. The AVI system then provides a wafer defect map. The wafer defect map identifies the locations of detected defects on the wafer in relationship to the boundaries of each region examined by the AVI tool. When processing of the wafer is completed, the disclosed method receives all defect maps for a specific wafer and accumulates the detected defects into a cumulative wafer defect map. The method can determine whether the AVI system is capable of providing the detail level necessary to provide marking of individual dies. When the AVI tool is not capable of this level of detail, the method utilizes stored small die information to generate a die defect map that indicates where defects are present within each die on the wafer. A defective die map is also produced that indicates individual defective die. The defective die map can be translated into a format used by a probe testing program and provided to the probe tester. Once received by the probe tester, the defective die map can be merged with a map created by probe testing or used alone. All die marked as defective in the defective die map are physically marked for scrapping prior to separating the wafer into individual dies.

In one aspect, an embodiment of a method of providing a semiconductor device is disclosed. The method includes receiving a wafer defect map comprising comparison regions and visual defect locations for a wafer; determining a format of the comparison regions, the format being chosen from a group comprising die-to-die, partial-shot-to-partial-shot and full-shot-to-full-shot; if the comparison format is not die-to-die, receiving mapping information that provides die locations within the comparison regions; and providing wafer layout map that identifies die locations within the wafer.

In another aspect, an embodiment of a non-transitory computer-readable medium having a sequence of program instructions which, when executed by a processor, perform a method of providing a semiconductor device is disclosed. The method performed by the program instructions includes receiving a wafer defect map comprising comparison regions and visual defect locations for a wafer; determining a format of the comparison regions, the format being chosen from a group comprising die-to-die, partial-shot-to-partial-shot and full-shot-to-full-shot; if the comparison format is not die-to-die, receiving mapping information that provides die locations within the comparison regions; and providing a wafer layout map that identifies die locations within the wafer.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

FIG. 6A depicts a wafer defect map produced by an AVI system using full shot comparison regions;

FIG. 6B depicts one shot of the wafer defect map of FIG. 6A that has been combined with a wafer layout map that provides small die details to produce a wafer defect map according to an embodiment of the disclosure;

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
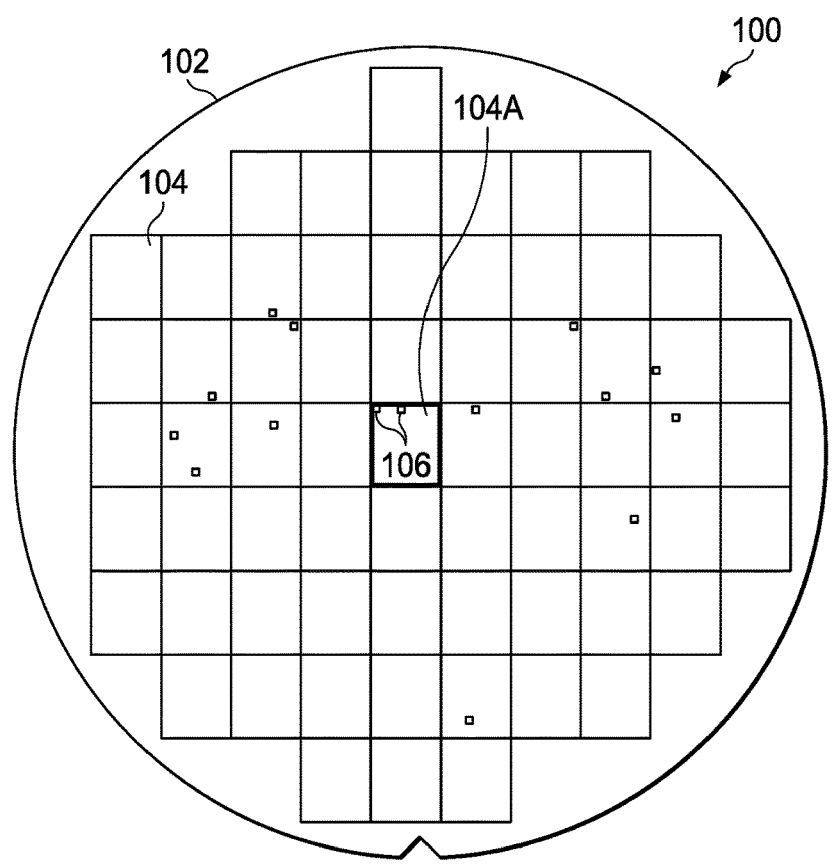
FIG. 1 depicts an example wafer defect map produced by an AVI system.

Turning first to FIG. 1, an example wafer defect map 100 created by an AVI system is shown. In one embodiment, wafer defect map 100 is derived from a KLA Results File (KLARF), although other file types can also be used. Rather than being a photograph of the wafer, which can include large amounts of information and take up similarly large amounts of storage, wafer defect map 100 includes a diagram of wafer 102 with specific subdivisions 104 indicated and the location of defects also indicated by defect indicators 106. In the specific example shown, comparison region 104A includes two defect indicators 106, while wafer 102 includes fifteen defect indicators 106 in total. Wafer defect map 100 can be produced during a final inspection of a wafer prior to dicing into individual die or can be produced at multiple points during processing of the wafer to detect defects at different levels within the manufactured dies. Because a wafer defect map takes up much less space than a corresponding actual image of the wafer, this format is useful in situations in order to maintain multiple images of defects from different processing steps over the lifetime of the wafer.

As a wafer is examined by an AVI system, regions of the wafer are compared to a "golden" image to determine whether defects exist in the region. The subdivisions 104 within wafer 102 are comparison regions, i.e., the regions that are compared to the golden image. In some instances, the comparison region can be a single die and the comparison is considered to be a die-to-die comparison. However, below a given die size, which can be dependent on the specific inspection system utilized, the inspection system can lack the ability to perform die-to-die comparisons, mandating that alternative methods be utilized.

In the embodiment shown in wafer defect map 100, the comparison region is a "shot". When a photolithographic image is applied to a wafer, e.g., in order to pattern a layer, the photolithographic image is applied multiple times as the reticle is stepped across the wafer; each application of the reticle is called a shot. The definition of the photolithographic shots utilized in a specific process can be provided to the AVI tool and utilized to create the map shown. It is known that each shot can include a large number of die. When defects are found within a shot, the AVI system may only be capable of indicating the shot that contains one or more defects, but be unable to indicate the specific die containing the defect(s). Faced with this situation, a manufacturer must then perform additional procedures to ensure that only defective dies are marked for scrapping.

Figure 2:
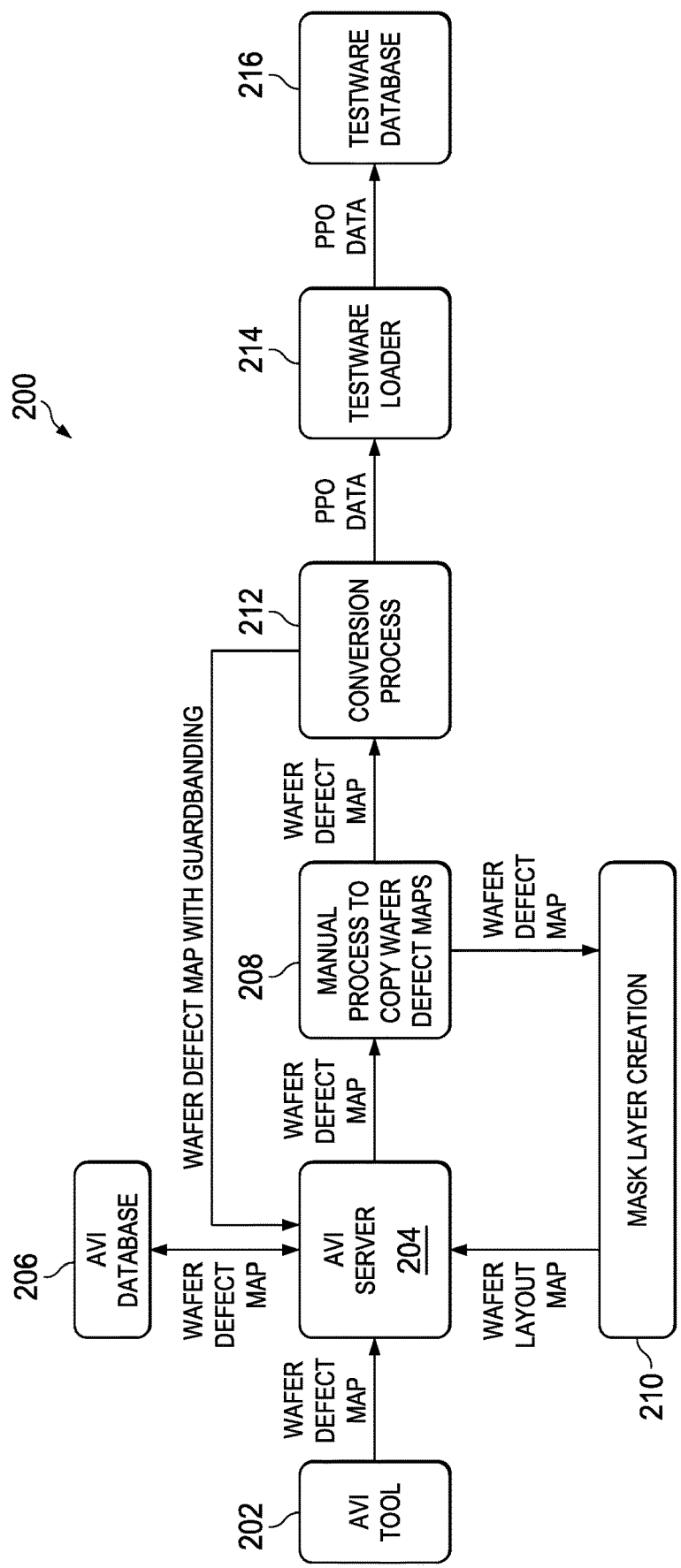
FIG. 2 depicts a method of manually providing input to an automated die inking process.

FIG. 2 depicts the flow 200 of a method of providing input to an automated die inking process after AVI; method 200 relies on manual intermediate steps to transfer information from the AVI system to the automated die inking process. In flow 200, AVI tool 202 performs automatic visual inspection on a wafer on which one or more integrated devices are being manufactured. Tools to perform AVI are well known in the art and provide outputs that indicate defects found during the inspection process, i.e., a wafer defect map. In one embodiment, a wafer defect map provided by AVI tool 202 is a KLARF, although alternate wafer defect maps can also be utilized. The wafer defect map, which may contain data similar to the wafer defect map shown in FIG. 1, is provided by the AVI tool 200 to a server 204 that is designed to receive and process the wafer defect maps. In the embodiment shown, server 204 runs Klarity™ software, sold by KLA-Tencor Inc., although other software systems able to provide wafer defect maps can also be utilized. AVI server 204 receives wafer defect maps and can perform processing on the wafer defect maps, as well as store and retrieve wafer defect maps in AVI database 206. The defect data stored in AVI database 206 can include multiple wafer defect maps for a single wafer, each of which can be produced at different stages of processing.

When processing of a given wafer is completed, one or more wafer defect maps are retrieved by AVI server 204 and sent to a manual process 208 to copy the wafer defect maps and to provide manual guardbanding where necessary. Manual process 208 collects all maps for a given wafer and can provide a cumulative wafer defect map from all maps for the given wafer that include defects. During manual process 208, data that defines how die are arranged on the wafer can be provided to mask layer creation 210 as part of a recipe for managing specific wafer types. With at least some AVI systems, limits as to the die size must be maintained in order to utilize the AVI system. Mask layer creation 210 is a process created by the Applicant that uses the information provided by manual process 208 to create a wafer layout map that will be discussed in greater detail below. This wafer layout map defines the boundaries of each die and can be provided to AVI Server 204.

Given a wafer defect map with cumulative defect data, which may include guardbanding, and an associated a wafer layout map, mask layer creation 210 creates a defective die map that indicates each die that either contains a defect or has been designated as part of a guardband. This defective die map is sent to conversion process 212. Conversion process 212 provides conversion from a coordinate format utilized by the AVI system to a coordinate format utilized by a test probe system that can provide automatic die inking. In one embodiment, the wafer defect map is converted to a Pre-Process Output (.PPO) format. The converted PPO file is then sent to testware loader 214, which can perform probe testing in preparation for automatic die inking. Additionally, copies of any files created by manual process 208 and mask layer creation 210 can be sent to AVI server 204 for storage in AVI database 206. Once testware loader 214 receives the PPO file, testware loader 214 may perform probe testing on the wafers and create a PPO file containing probing errors. Any files created by probe testing are then combined with a corresponding file received from conversion program 212 and stored in a testware database 216. Files concerning a batch of wafers will then move with the batch of wafers during any additional processing and used to provide ink marking on defective dies so that these dies can be removed from the stream of dies that will be shipped to customers.

Figure 3:
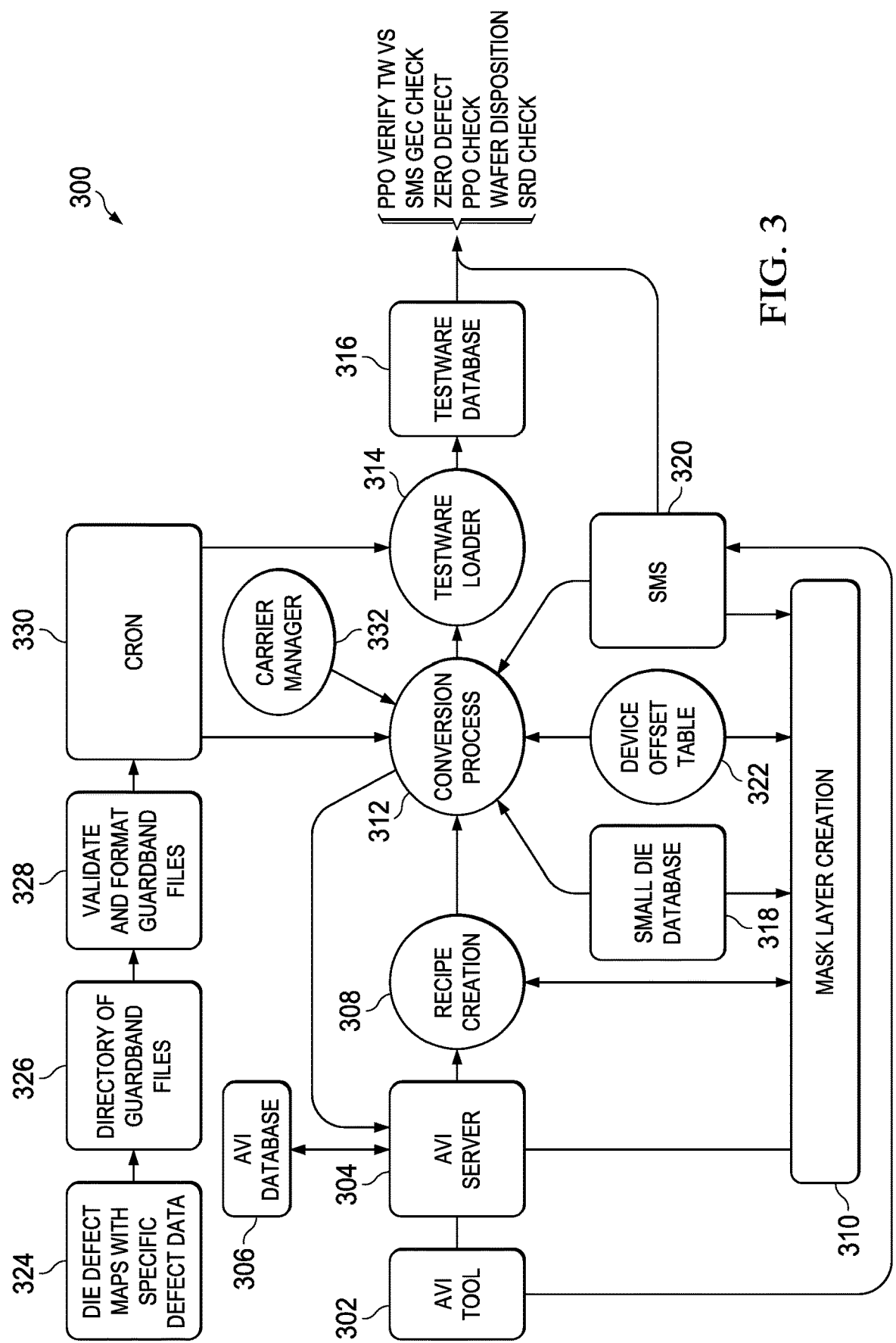
FIG. 3 depicts a method of providing automated die inking after AVI according to an embodiment of the disclosure.

In response to the issues identified with regard to manual processing of wafer defect maps in order to provide automatic inking of defective die identified by AVI, an automated process has now been provided, as shown in FIG. 3 according to an embodiment of the disclosure. Process flow 300 not only automates most or all of the process, but adds capabilities to utilize small dies that are beyond the capabilities of the AVI system to inspect individually. In process flow 300, AVI tool 302 creates wafer defect maps that identify the location of defects on individual wafers. The wafer defect maps are sent to AVI server 304 for processing and storage in AVI database 306. In one embodiment, AVI tool 302 is an automated visual inspection tool manufactured by Applied Materials and produces a wafer defect map, AVI server 304 utilizes Klarity™ software. It will be understood that in alternate embodiments, other AVI systems can be utilized that can produce wafer defect maps and that still further systems can be utilized that produce and manage other types of files that provide the location of defects on a wafer.

Recipe creation 308 is a new module in the disclosed process. A recipe as used in this context is a set of parameters that can be utilized by AVI server 304 to create and process the images it receives, e.g., optical and signal processing configurations. While the recipes used previously were manually created, recipe creation 308 triggers a series of events that substantially automate the process of creating recipes by using knowledge databases, information regarding the wafer layout and knowledge of the specific processes being performed on the wafer. For example, on receiving identification information for a specific wafer for which die inking is to be performed, recipe creation 308 can trigger mask layer creation 310 to create or retrieve an existing wafer layout map associated with the specific wafer. When dies on the wafer are smaller than the AVI system can manage or partial shots made near the edges of the wafer mandates the use of offsets during inspection, additional information can be received from various sources, e.g., a small die database 318 that is provided for the purposes of die inking and a Semiconductor Manufacturing System (SMS) 320, which is an overall flow control system for semiconductor manufacturing at a facility and contains information regarding the wafer layout. Offset information is sometimes necessary when partial photolithography shots have been utilized to create devices near an edge of the wafer, where no room exists for a full shot. If the inspection comparison region is a full shot, the devices created by a partial shot cannot be automatically visually inspected and will be skipped. However, in this instance, offset information must be provided to the inspection system to ensure that comparisons begin at the appropriate locations. When it is determined that offsets are necessary for a given wafer, device offset table 322 provides necessary offset information. Each of small die database 318, SMS 320 and device offset table 322 provides the requested information both to mask layer creation 310 and to conversion process 312 for use by these processes.

Mask layer creation 310 receives recipe information from recipe creation 308 and creates a wafer layout map, which can be provided to AVI server 302. Using the small die data received from small die database 318 and SMS 320, the wafer layout map provided by mask layer creation 310 is able to provide a map that includes all dies on the wafer and places a single "defect" indicator at the center of each die. This is true even when the AVI tool 302 is not able to inspect each die. Mask layer creation then uses the wafer layout map to provide additional maps for the wafer. Two maps are of interest in the present application. A die defects map provides the number and location of all defects identified in the original inspection map with respect to the die in which the defects are located. A defective die map identifies the individual dies that contain defects, but does not identify the number of defects within the die. This second defective die map will be utilized by conversion process 312 to provide a map of die to be marked for scrapping. In one embodiment, mask layer creation 310 receives a wafer defect map for an associated wafer from recipe creation 308 and merges the wafer defect map with the wafer layout map to create the die defects map and the defective die map. In one embodiment, the wafer layout map is saved using a Step ID of INKOUT-MASK, while the die defects map and defective die map are saved using a Step ID of INKDIE. In one embodiment, the die defects map is saved with a WAFERID of 000 and the defective die map is saved with a WAFERID of 001.

With some types of defects, dies that are near a defect but do not contain any portion of the defect may still be adversely affected in a manner that is not visible. In such instances, it may be determined that guardbanding of the defect should be performed. When a defect is detected that will require guardbanding, wafer defect maps with specific defect data 324 are identified and added to a directory of guardband files 326 A wafer layout map is also provided to the guardbanding program. Wafer defect maps and wafer layout maps that have been placed in the directory of guardband files 326 are received at validate and format guardband files 328, where automatic guardband regions are added around the identified defects using rules that identify how to apply a guardband to the specific type of defect. By using the application of rules that can be developed and refined over time, rather than relying on manual guardbanding, the application of guardband regions becomes standardized and the variations produced by manual guardbanding are eliminated. When a specific wafer is being converted by conversion process 312, CRON 330 determines whether any guardband maps exist for the wafer and if one or more guardband maps have been created, these maps are provided to conversion process 312. Conversion process 312 incorporates the guardband regions into the defective die maps received from recipe creation 308 prior to performing the conversion process. Carrier manager 332 is a program used to track the progress of individual wafers through the manufacturing process and can also provide information to conversion process 312.

Once the defective die map for a given wafer is determined to include all defects and guardbanding information associated with the wafer, a copy of the final defective die map is sent back to AVI server 304 for storage in AVI database 306 and the final defective die map is converted to a desired format, which may be a PPO format. In one embodiment, an example PPO file follows:

PPO_VERSION=1
PPO_TYPE=XYZ
USER_ID=XXXXXX
FACILITY=BBBB
LOT=1234567
WAFER_ID=X-1234567-22
DATE=06/01/2016 15:04:56
APPEND_DATA=YES
TEST_AREA=PARAMETRIC
PROGRAM=[TEST PROGRAM NAME]
X=11 Y=29 DIE_DISPOSITION_TYPE=SCRAP
X=12 Y=29 DIE_DISPOSITION_TYPE=SCRAP
X=13 Y=29 DIE_DISPOSITION_TYPE=SCRAP
X=14 Y=29 DIE_DISPOSITION_TYPE=SCRAP
X=15 Y=29 DIE_DISPOSITION_TYPE=SCRAP
X=51 Y=118 DIE_DISPOSITION_TYPE=SCRAP
X=51 Y=119 DIE_DISPOSITION_TYPE=SCRAP
X=51 Y=120 DIE_DISPOSITION_TYPE=SCRAP
X=51 Y=121 DIE_DISPOSITION_TYPE=SCRAP
X=51 Y=122 DIE_DISPOSITION_TYPE=SCRAP
X=81 Y=122 DIE_DISPOSITION_TYPE=SCRAP
X=82 Y=122 DIE_DISPOSITION_TYPE=SCRAP
X=83 Y=122 DIE_DISPOSITION_TYPE=SCRAP
X=84 Y=122 DIE_DISPOSITION_TYPE=SCRAP
X=85 Y=122 DIE_DISPOSITION_TYPE=SCRAP
END

The converted PPO file is provided to testware loader 314. Testware loader 314 performs probe testing on the wafer, if desired, and combines the output from probe testing with the PPO file received from conversion process 312. Testware loader then stores the combined PPO file in the testware database 316. If no probe testing is performed, only the PPO file created by conversion process 312 is stored in the testware database 316. The PPO file for a wafer lot is then kept with the wafer lot as that wafer lot is sent for further processing. The PPO file is used to perform die marking prior to die separation, enabling the later separation of die that will be shipped to a customer as functioning die and those that will not be shipped as functioning die. Finally, information from AVI tool 302, SMS 320 and testware database 316 are accumulated and used to perform various verification processes to ensure that all data is properly managed.

Figure 4A:
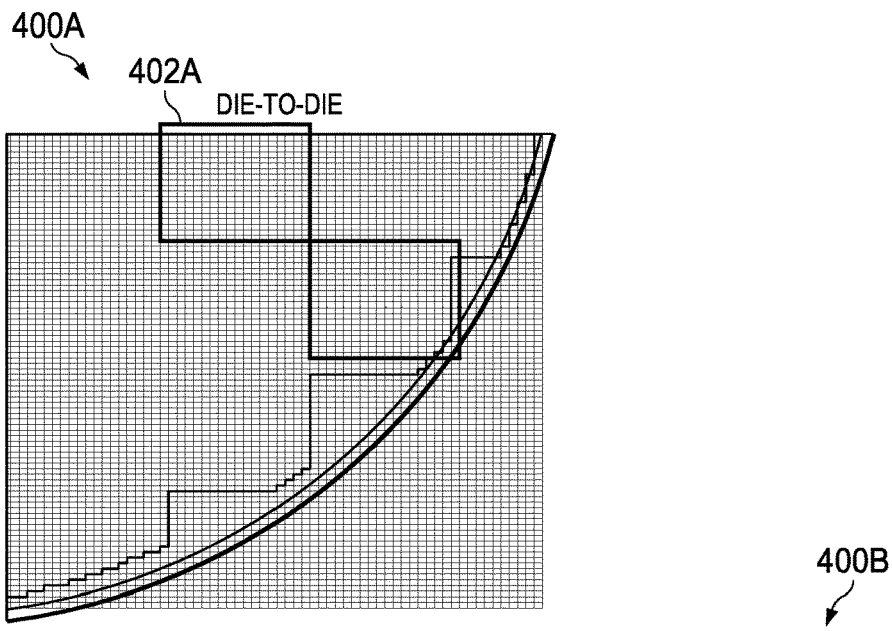
FIGS. 4A-4C depict the comparison regions that can be utilized to produce a die defect map according to an embodiment of the disclosure.
Figure 4B:
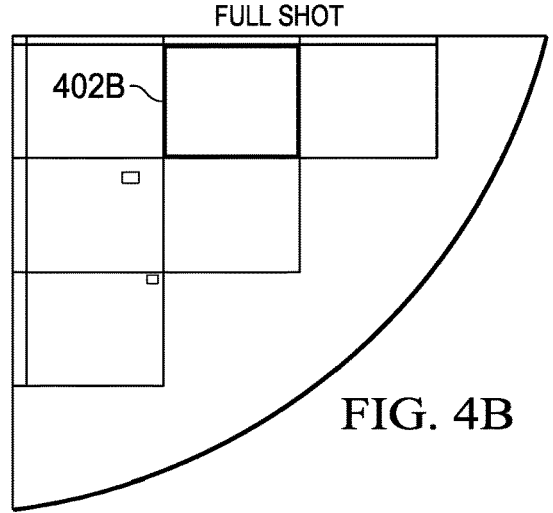
Figure 4C:
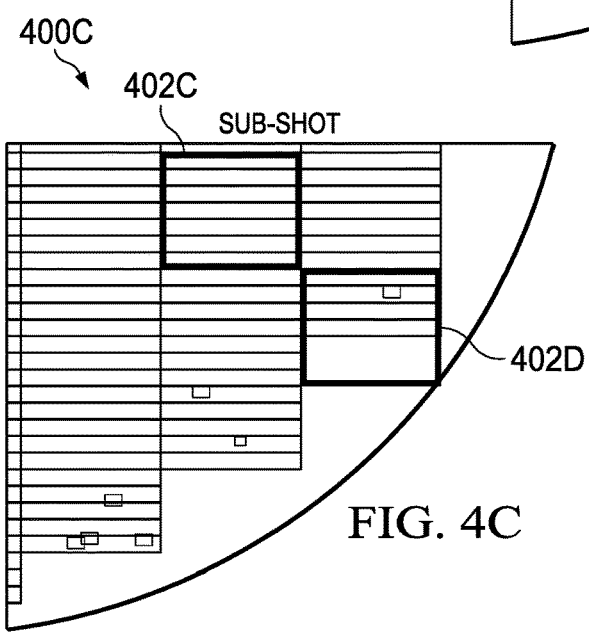

FIGS. 4A-4C depict three example wafers 400A, 400B, 400C that demonstrate the three types of comparison regions that can be utilized by AVI tool 302 when comparing the image of a wafer to a golden image. In these examples, an area 402 illustrates a shot that is utilized in a photolithographic process during manufacture of the wafer. In example wafer 400A, while shot 402A contains a large number of die arranged in a grid, the size of dies that are formed is within the capabilities of AVI tool 302, so the comparison region is die-to-die. However, in example wafers 400B and 400C, the dies have become so small that they are not reproducible in this figure. With these small dies, AVI 302 is unable to perform die-to-die comparisons. On wafer 400B, the number of die in a shot 402B is not divisible into regions that can be compared, e.g., in one example, the dies in full shot 402B are arranged in a grid that contains 23 dies vertically by 31 dies horizontally, necessitating the use of a full shot for the comparison region. Finally, in example wafer 400C, the number of dies in a shot 402C is also so large as to be beyond the capability of AVI 302 to examine die-to-die, but the shot can be subdivided into sub-shots that AVI 302 is able to manage. In one example, shot 402C is arranged in a grid 21 dies vertically by 31 dies horizontally. In this example, a sub-shot is defined as three rows that extend across the width of the shot and can be examined by AVI tool 302. Note that shot 402D was created using sub-shots; if this example wafer were examined using full shots, shot 402D could not be examined and use of an offset would be required.

When the comparison region is die-to-die, AVI 302 is not only able to perform die-to-die comparisons, but AVI server 304 can produce a map that shows the identified defects in relationship to the die map. However, when a full shot or sub-shot comparison is made, AVI server 304 is only able to mark the defect with respect to the full shot or sub-shot. In these instances, mask layer creation 310 is able to provide an wafer layout map that indicates the location of all dies on the associated wafer. The wafer layout map can then be utilized to create the desired die defects map and defective die map. Each of these outputs will now be explained in greater detail.

Figures 5A, 5B:
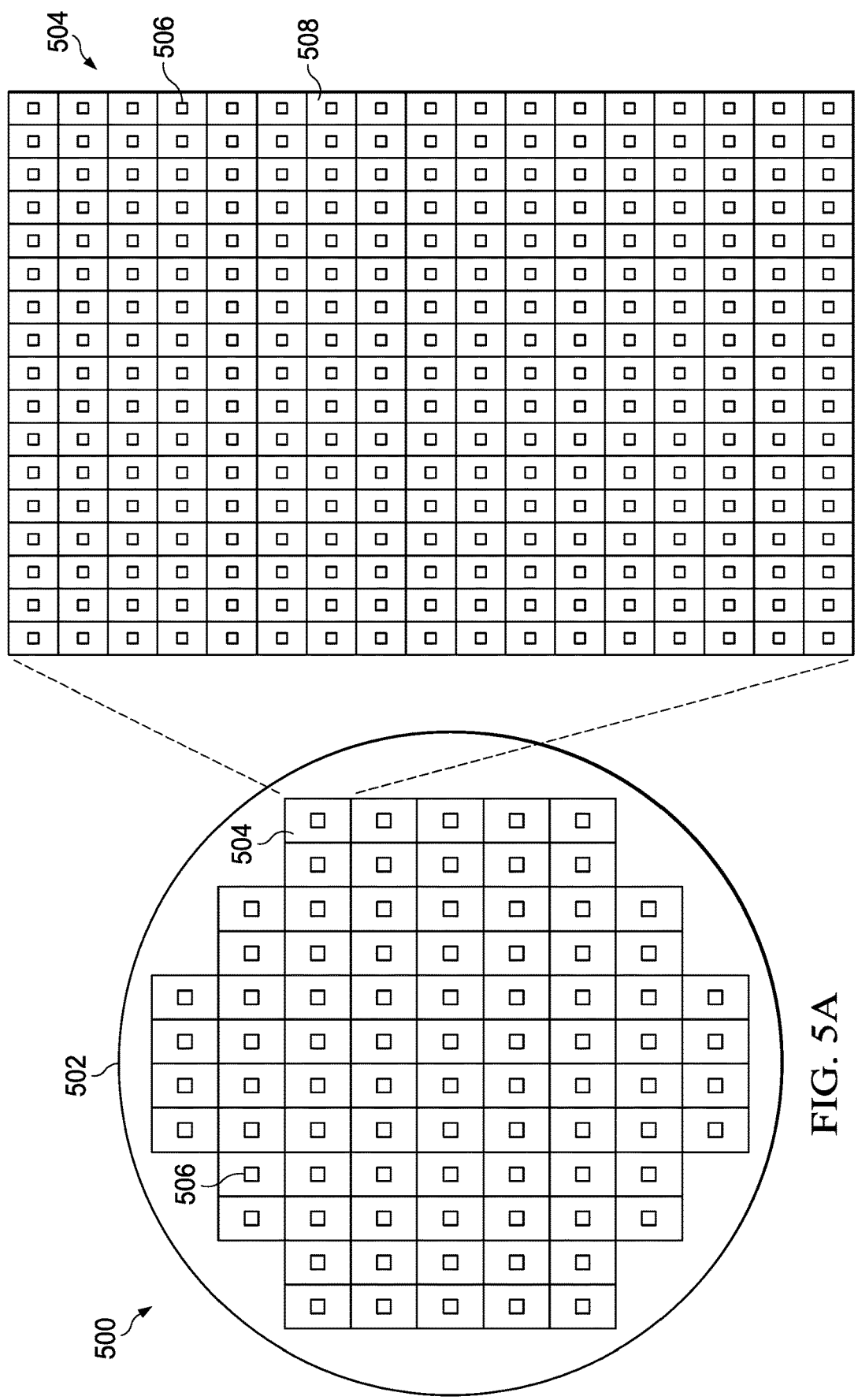
FIG. 5A depicts a wafer layout map using full shot comparison regions.
FIG. 5B depicts one shot of a wafer layout map that can be utilized to produce a die defect map according to an embodiment of the disclosure.

A wafer layout map is designed to identify the boundaries of each small die within a wafer. FIG. 5A depicts a wafer layout map 500 of a wafer 502 in which a number of comparison regions 504 are mapped. In wafer layout map 500, each comparison region 504 is a shot. When a full shot is utilized to perform AVI, AVI tool 302 is able only to mark the shot that contains a defect, so a map of the boundaries of the shots as created by AVI tool 302 would look like wafer layout map 500, with a single defect indicator 506 marking the center of each comparison region. Clearly, such a map does not provide the level of detail necessary to perform die inking of defective die. FIG. 5B depicts an enlarged single shot 504 in which the disclosed process has been performed to provide an wafer layout map that identifies the individual dies 508 within shot 504 using defect markers 506 to indicate the center of each die. When a full shot or sub-shot comparison is made, mask layer creation 310 receives necessary information regarding the small die and any offset from small die database 318, SMS 320 and device offset table 322. An appropriate wafer layout map containing the level of detail shown in FIG. 5B across the entire map is created by mask layer creation 310.

Figure 6C:
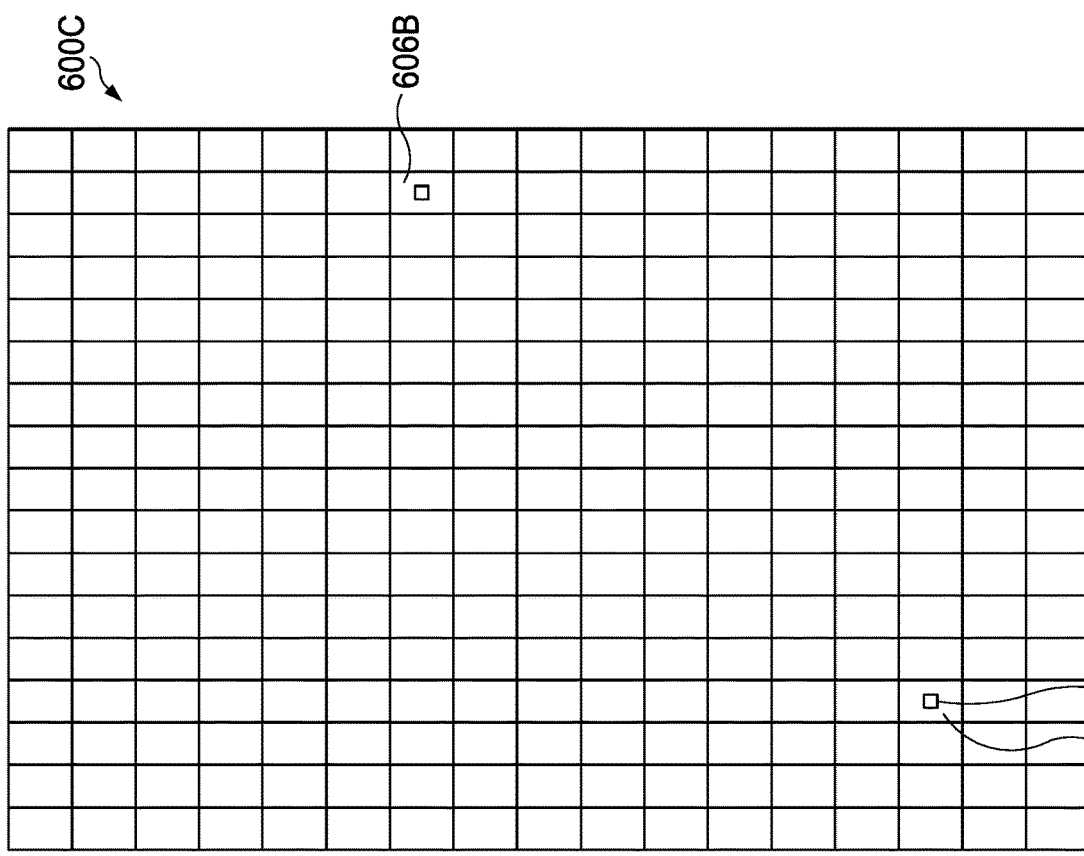
FIG. 6C depicts one shot of a wafer defect map produced according to an embodiment of the disclosure.
Figure 8A:
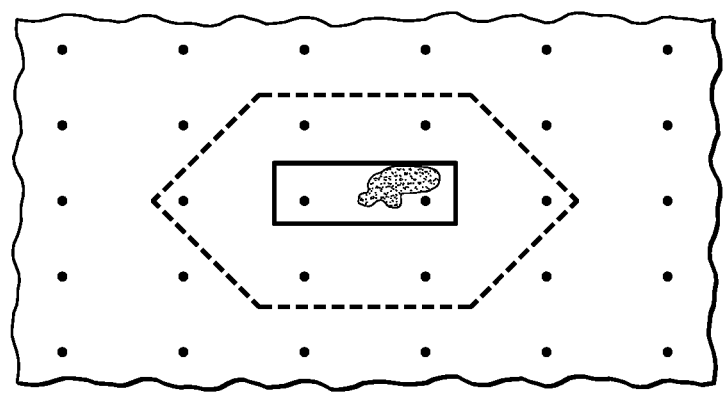
FIGS. 8A-8I depict a number of defects that have been manually guardbanded.
Figure 8B:
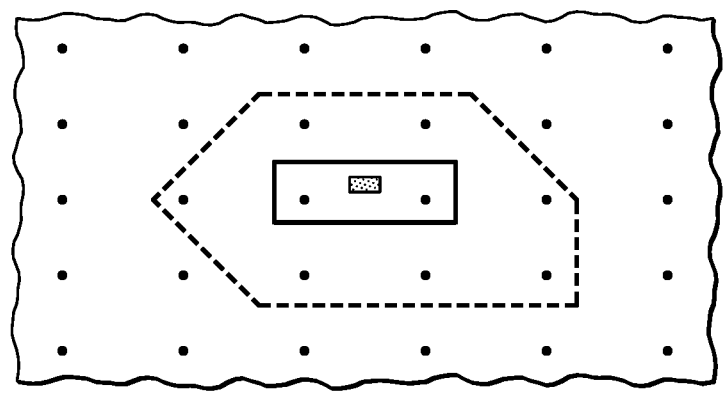
Figure 8C:
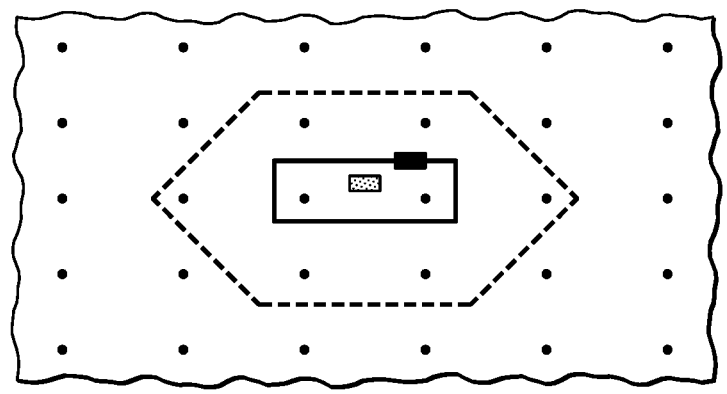
Figure 8D:
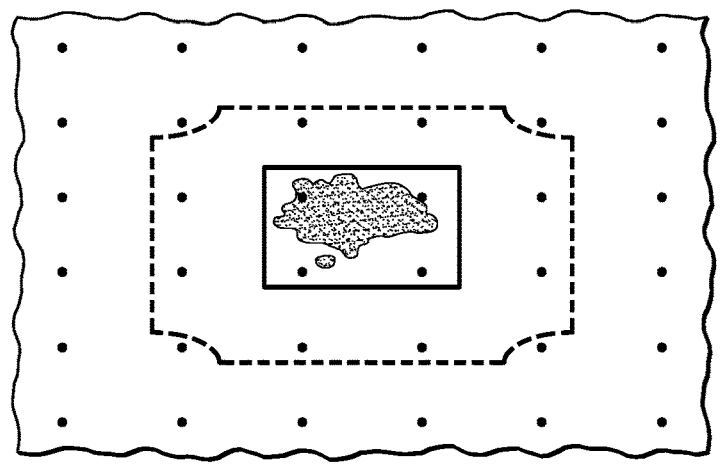
Figure 8E:
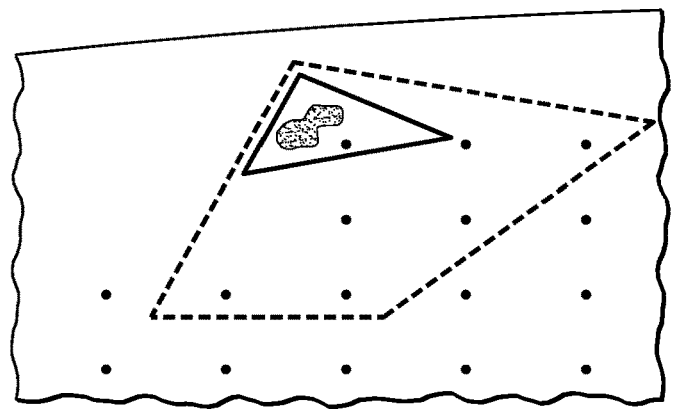
Figure 8F:
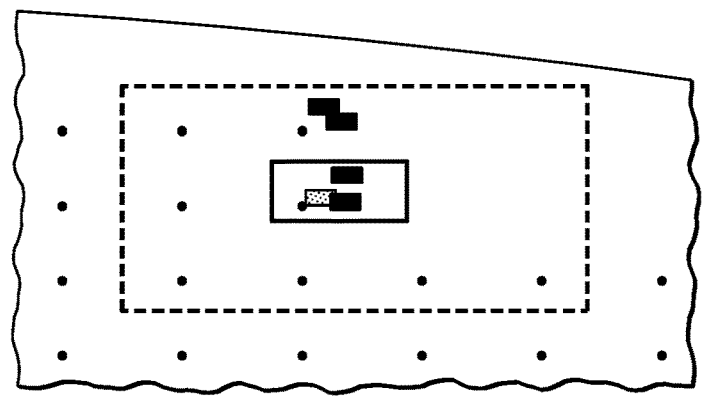
Figure 8G:
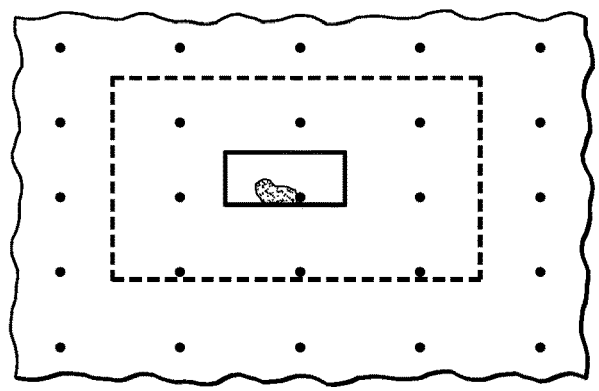
Figure 8H:
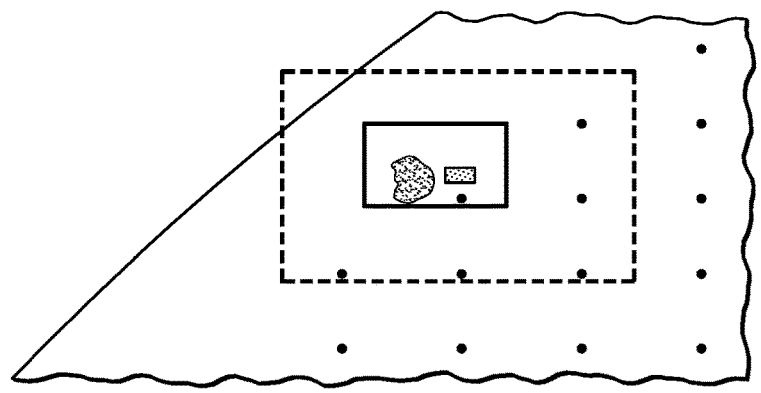
Figure 8I:
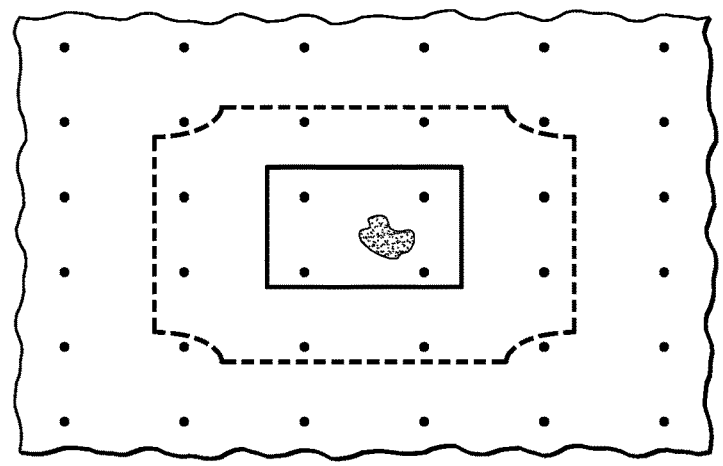

FIG. 6A depicts a wafer defect map 600 produced when AVI examined wafer 602 using full shots. Five defects were detected and are located in three different comparison regions 604A, 604B, 604C. Comparison region 604A contains a single defect, while comparison regions 604B, 604C contain two defects each. Because the die are beyond the capability of AVI tool 302 to examine die-to-die, further identification of the location of the defects within a die cannot be provided by AVI tool 302. The disclosed method is able to create a die defects map having much greater detail than is shown in FIG. 6A; a portion of these detailed die defects map is shown in FIGS. 6B and 6C, which depicts only comparison region 604C Region 604C has been enlarged to demonstrate the details. In each of FIGS. 6B, 6C, comparison region 604C includes a total of 289 dies arranged in a 17×17 grid. By combining wafer defect map 600 with an wafer layout file having the level of detail shown in FIG. 5B, the disclosed method creates the two maps shown in FIGS. 6B and 6C. FIG. 6B depicts single shot of a die defects map that provides the number and location of defects in relation to individual die, the two defects that were identified in comparison region 604C can now be identified as being located in specific die regions 606A, 606B. Similarly, in the depicted single shot 600C of a defective die map shown in FIG. 6C, the two die regions 606A and 606B are indicated to be defective dies by the single defect indicator 608 placed in the center of these two die regions and will not be shipped to customers as working dies.

Figure 7:
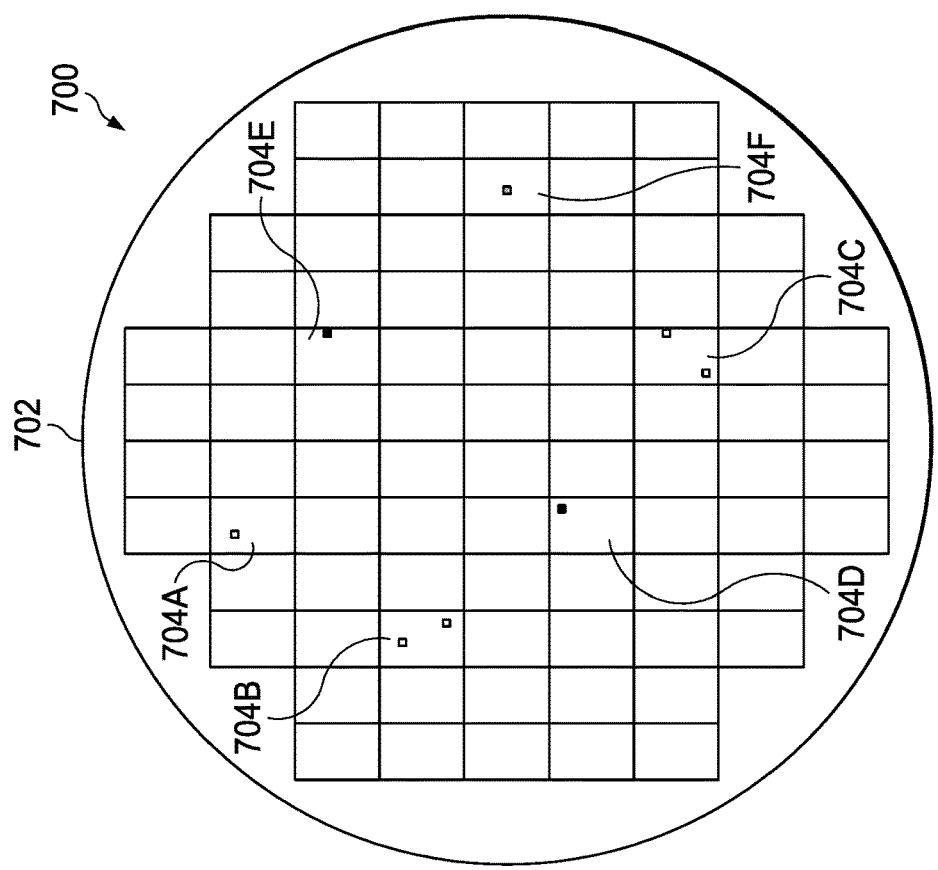
FIG. 7 depicts a cumulative wafer defect map that combines the wafer defect map of FIG. 6A with wafer defect maps of other layers.

While the examples provided thus far have been to defects located within a single layer, FIG. 7 depicts a cumulative wafer defect map 700 that can be produced by recipe creation 308 for a wafer 702. Wafer defect map 700 includes the defects that were detected in comparison regions 704A, 704B, 704C, which in an example embodiment were detected in a first inspection. Wafer defect map 700 also depicts defects in comparison regions 704D, 704E that were detected during a second inspection and a single defect located in comparison regions 704F that was detected during a third inspection. By combining composite wafer defect map 700 with a wafer layout map at the level of detail shown in FIG. 5B, all of the defects in composite wafer defect map 700 can be located in a specific die and the associated dies can be marked for scrapping.

When some types of defects are detected, the damage caused by the defect can extend beyond the die on which the defect is located, yet not leave any visible sign. In these situations, a prudent manufacturer performs guardbanding to ensure that other die that may be affected are marked as defective and are not shipped to customers. FIGS. 8A-8I depict nine instances of wafers on which manual guardbanding was applied to defects. A grid of dots in each image identifies the center of each die present in the region near the defect(s). For each defect that is of the type to be guardbanded (shown by a textured region), a solid line encompasses the dies that include some portion of the visible defect; the dies encompassed by the solid line are thus indicated to be defective in an initial inspection. A larger, dotted line surrounding each defect depicts the guardband that has been added in each instance using manual guardbanding. (Note that other types of defects, which are not to be guardbanded, are shown as solid black regions in some of the figures. Because these other types of defects are not part of the guardbanding process, the dies associated with these types of defects are not shown as being defective in these figures.) When manual guardbanding is performed, the tendency is to guardband larger areas to compensate for uncertainty in the defect coverage and allow for human variation. These images make it clear that a large amount of variation can exist when utilizing manual guardbanding.

Figure 9:
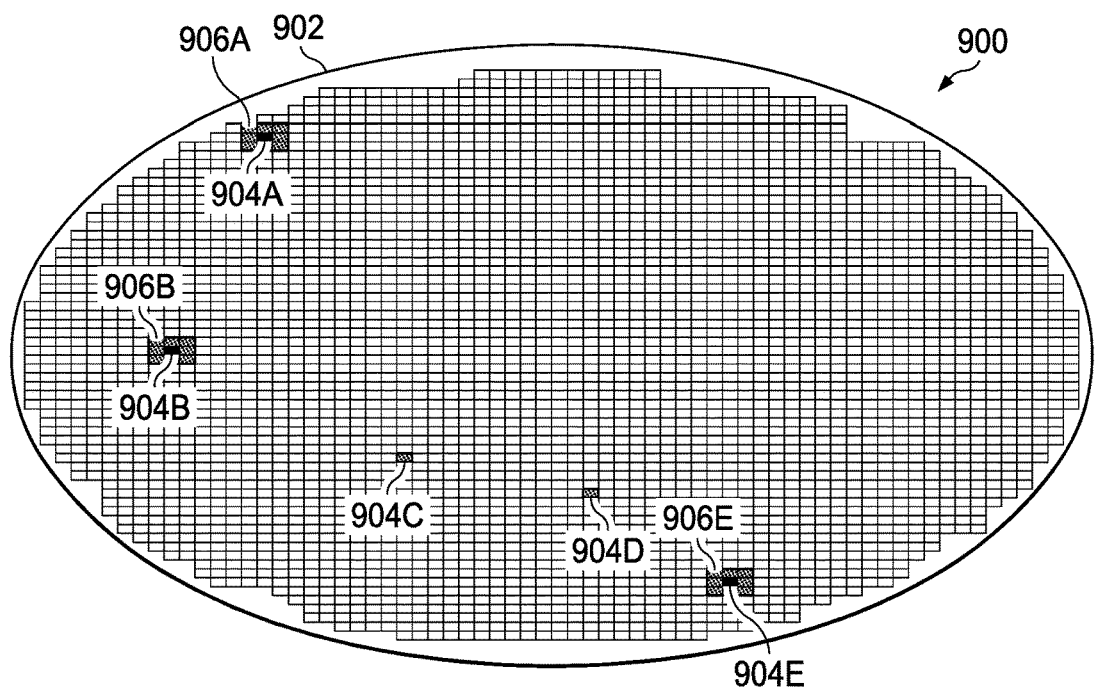
FIG. 9 depicts a defective die map on which three of the five defects have been automatically guardbanded.

FIG. 9 depicts a wafer defect map 900 that includes automatic guardbanding. In the examination of wafer 902, defects were detected in five dies 904. Further review of the defects determined that the defects in dies 904A, 904B, 904E were of a type that necessitates guardbanding while defects 904C, 904D were of a type that did not require guardbanding. Rules for the application of a guardband to the detected defects were then retrieved and applied to each of the detected defects, resulting in the consistent guardbanding shown by guardbanded regions 906A, 906B, 906E. Use of the disclosed automated guardbanding eliminates the need for human interpretation and allows for both a reduction in man-hours and tighter guardband limits. In one review of the savings provided by automated guardbanding, a decrease in disposition time of thirty minutes per lot was seen and ten percent fewer dies were inked, resulting in a significant cost savings for the manufacturer.

Figure 10A:
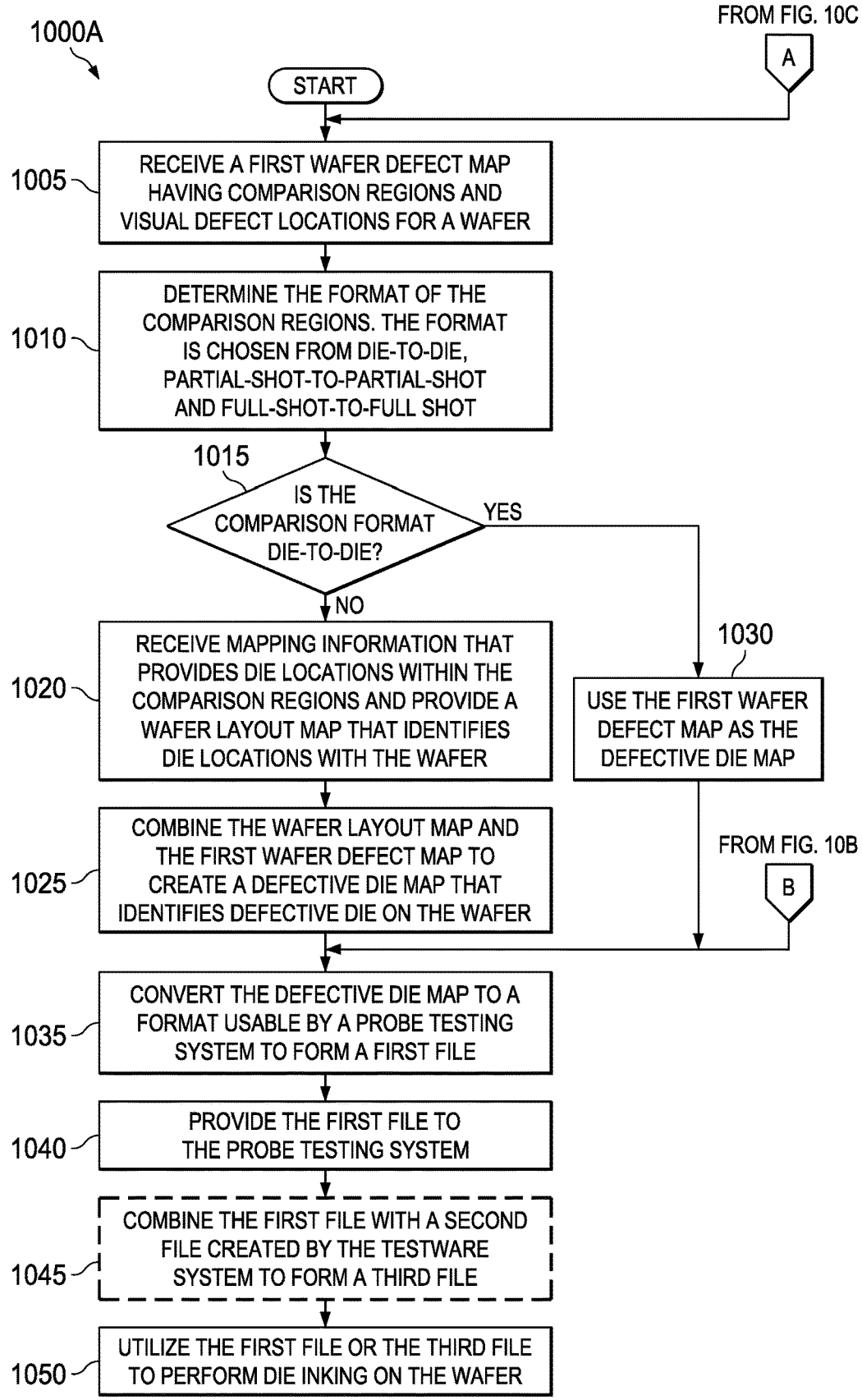
FIGS. 10A-10C depict portions of a method of producing a semiconductor device according to an embodiment of the disclosure.
Figure 10B:
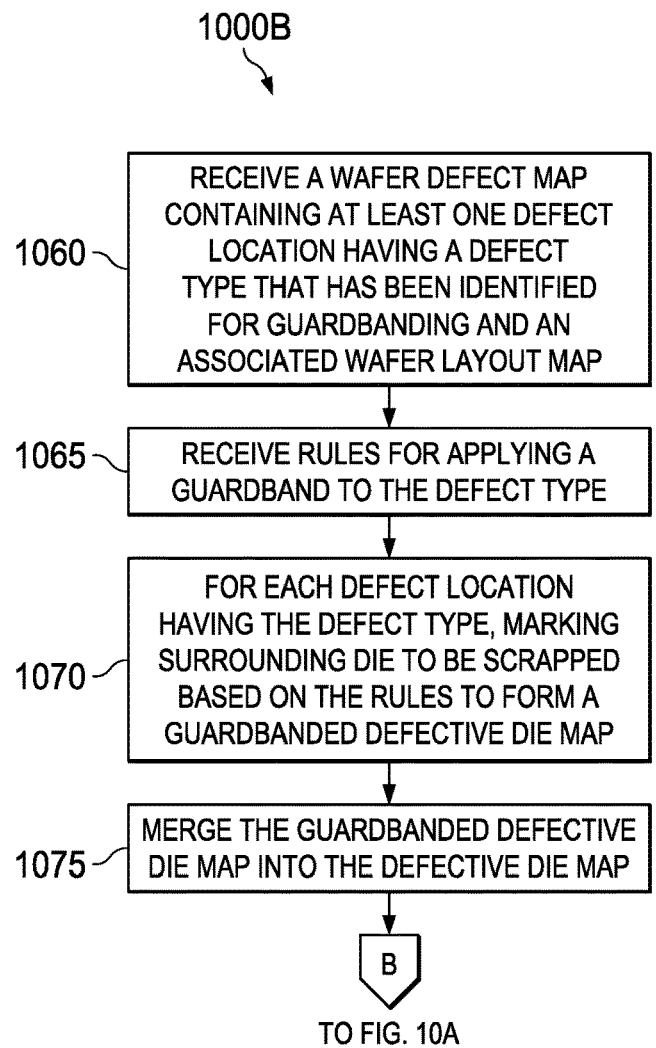
Figure 10C:
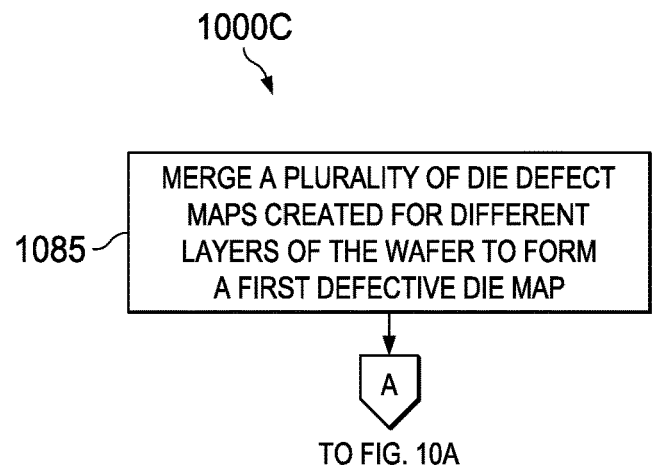

FIGS. 10A-10C together provide a flowchart 1000 of a method of providing a semiconductor device according to an embodiment of the disclosure. In flowchart 1000A, the method receives 1005 a first wafer defect map that defines comparison regions and visual defect locations for a wafer. As noted previously, the format used for the comparison regions can be die-to-die, but can also be full-shot-to-full-shot or partial-shot-to-partial-shot. The methodology determines 1010 the specific format used for the comparison regions and further determines 1015 whether the format is die-to-die. If the format is not die-to-die, the first wafer defect map does not contain a level of detail that can identify the location of defects with respect to specific dies, so additional information must be utilized to further define the location of dies within the wafer. As triggered by recipe creation 308, mask layer creation receives 1020 mapping information that provides die locations within the comparison regions and provides a wafer layout map that identifies die locations within the wafer. The wafer layout map and the wafer defect map are combined 1025 to create a first defective die map that identifies defective die on the wafer; a die defects map that identifies defects with regard to specific dies can also be created at the same time. If the comparison format was die-to-die, the first wafer defect map contains information that identifies the location of defects with respect to specific dies and can be utilized to perform die inking once an appropriate conversion is performed, so the first wafer defect map is utilized 1030 as the first defective die map.

Conversion process 312 then converts 1035 the first defective die map to a format usable by a probe testing system to form a first file and provides 1040 the first file to the probe testing system. The probe testing system can combine 1045 the first file with a second file created by the probe testing system, although this element can be omitted if only inking from visual inspection is desired. If the first and second files are combined, they form a third file. Either the first file or the third file is utilized to perform 1050 die inking on the wafer. It will be understood that die inking may be performed at the same facility where inspection and/or testing of the wafers was performed, but can also be provided at a different facility. In the latter case, a file that indicates all defective die on a wafer or set of wafers will travel with the wafer(s) when they are transported.

Flowchart 1000B depicts the process for defects that need to be guardbanded. The method receives 1060 a wafer defect map that contains at least one defect location that has a defect type that has been identified for guardbanding and also receives an associated wafer layout file. The method also receives 1065 rules for applying a guardband to the specific defect that has been detected. For each defect location having the identified defect type, the method marks 1070 surrounding die that are to be scrapped based on the received rules to form a guardbanded defective die map. The guardbanded defective die map is then merged 1075 into the first defective die map. At this point, the guardbanding process is complete and the main process is joined at element 1035 for conversion of the defective die map to a format usable by the probe testing process. Flowchart 1000C depicts an element of the method that can be utilized to merge 1085 multiple wafer defect maps that were created for different layers of the wafer to form a cumulative wafer defect map. This cumulative wafer defect map can then be utilized as the first wafer defect map in element 1005.

A method of providing a semiconductor device has been described. The method receives inspection files that provide a wafer defect map, such as KLARF files created by an AVI system and provides files in a format, such as PPO, which is usable by a probe tester to provide automatic die inking. The disclosed process works with any device die size and can provide automatic guardbanding when desired for one or more inspection levels and defects of interest.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a network element, etc.). Such network elements may store and communicate internally and/or with other network elements over a network code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. Thus, the storage device or component of a given electronic device may be configured to store code and/or data for execution on one or more processors of that electronic device for purposes of implementing one or more techniques of the present disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method of making a semiconductor device, the method comprising:
   receiving a wafer defect map that defines comparison regions and identifies visual defect locations for a wafer;
   determining a format of the comparison regions, the format being chosen from a group consisting of partial-shot-to-partial-shot and full-shot-to-full-shot;
   receiving mapping information that provides die boundaries within the comparison regions; and
   providing a wafer layout map that identifies die boundaries within the wafer and a single "defect" indicator at a center of each die;
   die inking the wafer; and
   dicing up the wafer to produce individual dies.

2. The method of claim 1, wherein the mapping information is received from system databases and comprises at least one of small die information and offset information.

3. The method of claim 1, further comprising combining the wafer layout map and the wafer defect map to create a defective die map that identifies defective dies on the wafer.

4. The method of claim 3, further comprising converting the defective die map to a format usable by a probe testing system to form a file.

5. The method of claim 4, wherein the file has a pre-process output (.PPO) format.

6. The method of claim 4, further comprising providing the file to the probe testing system.

7. The method of claim 6, further comprising combining the file with a second file created by the probe testing system to create a third file.

8. The method of claim 7, further comprising utilizing one of the file and the third file to perform the die inking on the wafer.

9. The method of claim 1, further comprising merging a plurality of wafer defect maps created for different layers of the wafer to form the wafer defect map.

10. A method of making a semiconductor device, the method comprising:
    receiving a wafer defect map that defines comparison regions and identifies visual defect locations for a wafer;
    determining a format of the comparison regions, the format being chosen from a group consisting of partial-shot-to-partial-shot and full-shot-to-full-shot;
    receiving mapping information that provides die boundaries within the comparison regions;
    providing a wafer layout map that identifies die boundaries within the wafer and a single "defect" indicator at a center of each die;
    die inking the wafer;
    dicing up the wafer to produce individual dies;
    receiving the wafer defect map containing at least one defect location having a defect type that has been identified for guardbanding and an associated wafer layout map;
    receiving rules for applying a guardband to the defect type; and
    for each defect location having the defect type, marking surrounding die to be scrapped based on the rules to form a guardbanded defective die map.

11. The method of claim 10, further comprising merging the guardbanded defective die map into the defective die map prior to converting the defective die map.

12. A non-transitory computer-readable medium having a sequence of program instructions which, when executed by a processor, perform a method of making a semiconductor device, the method comprising:
   receiving a wafer defect map that defines comparison regions and identifies visual defect locations for a wafer;
   determining a format of the comparison regions, the format being chosen from a group consisting of partial-shot-to-partial-shot and full-shot-to-full-shot;
   receiving mapping information that provides die locations within the comparison regions;
   providing a wafer layout map that identifies die boundaries within the wafer and a single "defect" indicator at a center of each die;
   die inking the wafer; and
   dicing up the wafer to produce individual dies.

13. The non-transitory computer-readable medium of claim 12, wherein the method further comprises combining the wafer layout map and the wafer defect map to create a defective die map that identifies defective die on the wafer.

14. The non-transitory computer-readable medium of claim 13, wherein the method further comprises converting the defective die map to a format usable by a probe testing system to form a file and providing the file to the probe testing system.

15. The non-transitory computer-readable medium of claim 14, wherein the method further comprises:
   receiving a defective die map that identifies at least one defect location having a defect type that has been identified for guardbanding;
   receiving rules for applying a guardband to the defect type;
   for each defect location having the defect type, marking surrounding die to be scrapped based on the rules to form a guardbanded defective die map; and
   merging the guardbanded defective die map with the defective die map prior to converting the defective die map.

16. A system, comprising:
   a processor; and
   a memory including computer program instructions which, when executed by the processor, cause the system to:
     determine a format of comparison regions of a wafer defect map, the format being chosen from a group consisting of partial-shot-to-partial-shot and full-shot-to-full-shot,
     receive mapping information that provides die locations within the comparison regions,
     providing a wafer layout map that identifies die boundaries within the wafer and a single "defect" indicator at a center of each die,
     combine the wafer layout map and the wafer defect map to create a defective die map that identifies defective dies on the wafer, and
     convert the defective die map to a format usable by a probe testing system to form a file having a pre-process output (.PPO) format.

17. The system of claim 16, wherein the memory includes further computer program instructions which, when executed by the processor, cause the system to provide the file to a probe testing system.

18. The system of claim 16, wherein the memory includes further computer program instructions which, when executed by the processor, cause the system to combine the file with a second file created by the probe testing system to create a third file.

19. The system of claim 18, wherein the memory includes further computer program instructions which, when executed by the processor, cause the system to perform die inking on the wafer using one of the file and the third file.

20. A system, comprising:
   a processor; and
   a memory including computer program instructions which, when executed by the processor, cause the system to:
     determine a format of comparison regions of a wafer defect map, the format being chosen from a group consisting of partial-shot-to-partial-shot and full-shot-to-full-shot
     receive mapping information that provides die locations within the comparison regions,
     providing a wafer layout map that identifies die boundaries within the wafer and a single "defect" indicator at a center of each die,
     combine the wafer layout map and the wafer defect map to create a defective die map that identifies defective dies on the wafer, and
   convert the defective die map to a format usable by a probe testing system to form a file having a pre-process output (.PPO) format;
   wherein the memory includes further computer program instructions which, when executed by the processor, cause the system to:
     receive a wafer defect map including at least one defect location having a defect type that has been identified for guardbanding and an associated wafer layout map;
     receive rules for applying a guardband to the defect type; and
     for each defect location having the defect type, mark surrounding die to be scrapped based on the rules to form a guardbanded defective die map.

* * * * *